(12) United States Patent
Lam et al.

(10) Patent No.: US 10,027,550 B2
(45) Date of Patent: Jul. 17, 2018

(54) SYSTEM AND METHOD FOR MULTITENANT-AWARE CONSOLE FOR USE IN A MULTITENANT APPLICATION SERVER ENVIRONMENT

(71) Applicant: ORACLE INTERNATIONAL CORPORATION, Redwood Shores, CA (US)

(72) Inventors: Anissa Lam, Santa Clara, CA (US); Loren Konkus, Novi, MI (US); Suma Sri Uppala, Bangalore (IN); Srinivas Krishnan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 93 days.

(21) Appl. No.: 14/747,982

(22) Filed: Jun. 23, 2015

(65) Prior Publication Data
US 2015/0372883 A1    Dec. 24, 2015

Related U.S. Application Data

(60) Provisional application No. 62/016,061, filed on Jun. 23, 2014.

(51) Int. Cl.
 *G06F 15/173* (2006.01)
 *H04L 12/24* (2006.01)
 *H04L 29/08* (2006.01)

(52) U.S. Cl.
 CPC .......... *H04L 41/0893* (2013.01); *H04L 67/10* (2013.01)

(58) Field of Classification Search
CPC ....... H04L 67/10; H04L 67/42; G06F 9/5077; G06F 9/5072; G06F 8/60; G06F 9/45558; G06F 17/30584
See application file for complete search history.

(56) References Cited

U.S. PATENT DOCUMENTS

| 9,154,366 | B1 * | 10/2015 | Martin | H04L 29/08072 |
| 9,325,585 | B1 * | 4/2016 | Wang | H04L 41/5067 |
| 2003/0220993 | A1 * | 11/2003 | Blizniak | G06F 8/60 709/223 |
| 2006/0218521 | A1 * | 9/2006 | Hagstrom | G06F 8/20 717/101 |
| 2008/0091808 | A1 * | 4/2008 | Mei | H04L 67/025 709/223 |
| 2011/0213870 | A1 * | 9/2011 | Cai | H04L 67/10 709/223 |

(Continued)

*Primary Examiner* — Peling Shaw
(74) *Attorney, Agent, or Firm* — Tucker Ellis LLP

(57) ABSTRACT

Described herein is a system and method for providing and administering a partitionable environment for operating application software. The environment is provided together with a plurality of deployable resources usable within the environment and one or more resource group templates. Each resource group template defines a grouping of the deployable resources within a domain. An administration console is usable to create and configure one or more partitions within the domain, with each partition providing an administrative and runtime subdivision of the domain. The administration console can be set to display the one or more partitions and enable creation and configuration of specific artifacts within the one or more partitions.

16 Claims, 21 Drawing Sheets

(56) References Cited

U.S. PATENT DOCUMENTS

| | | | |
|---|---|---|---|
| 2011/0265147 A1* | 10/2011 | Liu | H04L 63/08 726/4 |
| 2011/0320520 A1* | 12/2011 | Jain | G06F 9/5072 709/203 |
| 2012/0047239 A1* | 2/2012 | Donahue | G06F 9/5072 709/220 |
| 2012/0072597 A1* | 3/2012 | Teather | H04L 47/70 709/226 |
| 2012/0167081 A1* | 6/2012 | Sedayao | G06F 11/30 718/1 |
| 2013/0232191 A1* | 9/2013 | Cheng | H04L 67/42 709/203 |
| 2014/0359126 A1* | 12/2014 | Breternitz | H04L 47/70 709/226 |
| 2015/0207758 A1 | 7/2015 | Mordani et al. | |
| 2015/0370549 A1 | 12/2015 | Zhang et al. | |
| 2015/0370608 A1 | 12/2015 | Dipol et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0094647 A1 | 3/2016 | Mordani et al. | |
| 2016/0142506 A1 | 5/2016 | Sahoo et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

\* cited by examiner

SYSTEM AND METHOD FOR MULTITENANT-AWARE CONSOLE FOR USE IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR MULTITENANT-AWARE CONSOLE FOR USE IN A MULTITENANT APPLICATION SERVER ENVIRONMENT", Application No. 62/016,061, filed Jun. 23, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference. G

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to environments for operating application software, and are particularly related to systems and methods for providing and administering a partitionable environment for operating application software, such as a multi-tenant cloud or application server environment.

BACKGROUND

Software application servers, examples of which include Oracle WebLogic Server (WLS) and Glassfish, generally provide a managed environment for running enterprise software applications. Recently, technologies have also been developed for use in partitionable environments, such as partitionable application server and cloud environments, which allow users or tenants to develop and run their applications within the environment, and to take advantage of distributed resources provided by the environment.

SUMMARY

In accordance with an embodiment, described herein is a system and method for providing and administering a partitionable environment for operating application software. The environment is provided together with a plurality of deployable resources usable within the environment and one or more resource group templates. Each resource group template defines a grouping of the deployable resources within a domain. An administration console is usable to create and configure one or more partitions within the domain, with each partition providing an administrative and runtime subdivision of the domain. The administration console can be set to display the one or more partitions and enable creation and configuration of specific artifacts within the one or more partitions.

BRIEF DESCRIPTION OF THE FIGURES

FIG. 8 illustrates a creation page for a virtual target, in accordance with an embodiment.

FIG. 9 illustrates a summary of virtual targets page, in accordance with an embodiment.

FIGS. 10 and 11 illustrate creation pages for a resource group template, in accordance with an embodiment.

FIGS. 16 and 17 illustrate a summary of domain partitions page, in accordance with an embodiment.

FIGS. 18 and 19 illustrate a settings page for a domain partition, in accordance with an embodiment.

FIG. 21 illustrates a settings page for a resource group, in accordance with an embodiment.

DETAILED DESCRIPTION

In accordance with an embodiment, described herein is a system and method for providing and administering a partitionable environment for operating application software. The environment is provided together with a plurality of deployable resources usable within the environment and one or more resource group templates. Each resource group template defines a grouping of the deployable resources within a domain. An administration console is usable to create and configure one or more partitions within the domain, with each partition providing an administrative and runtime subdivision of the domain. The administration console can be set to display the one or more partitions and enable creation and configuration of specific artifacts within the one or more partitions.

Application Server (e.g., Multi-Tenant, MT) Environment

Figure 1:
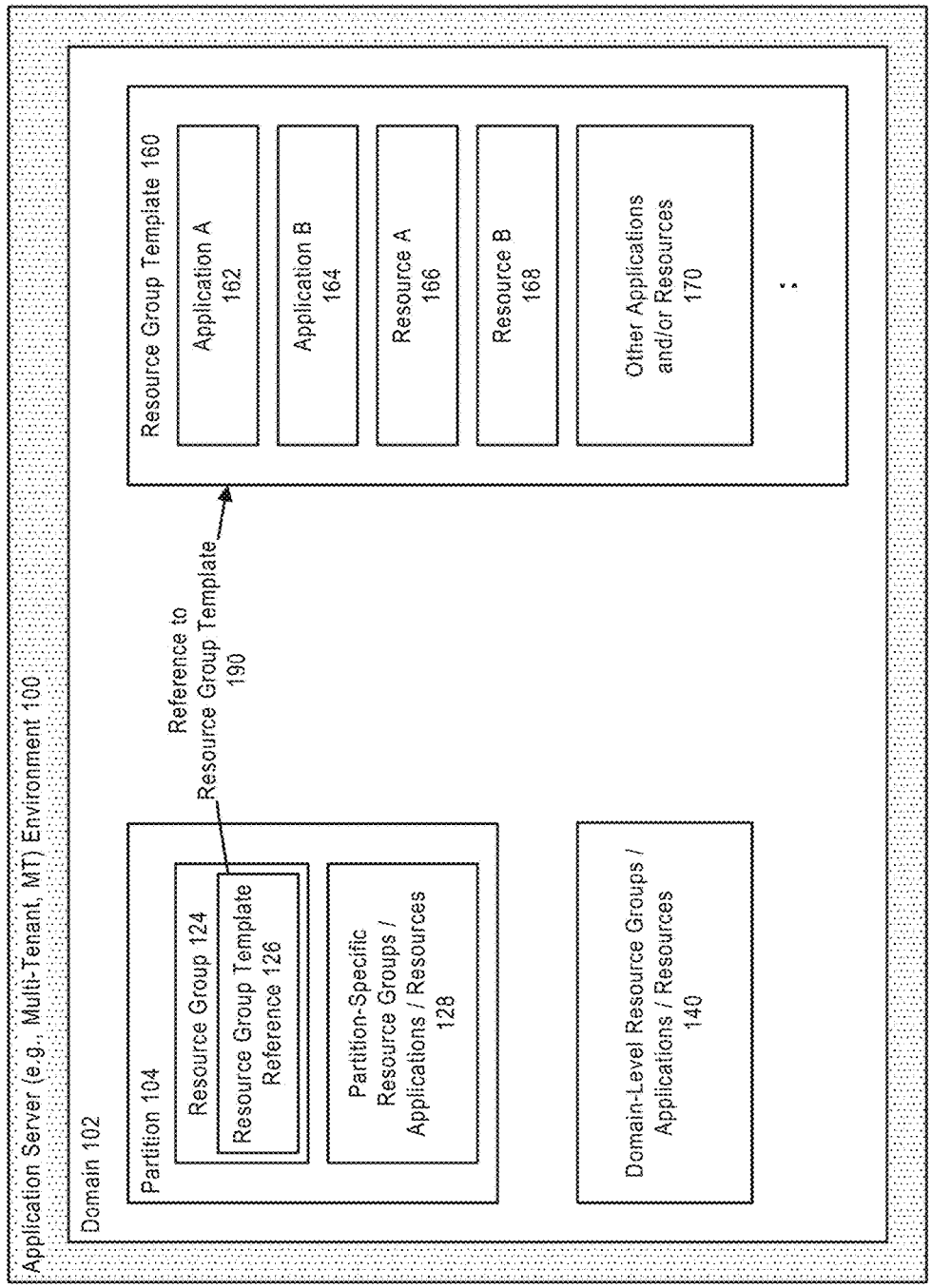
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
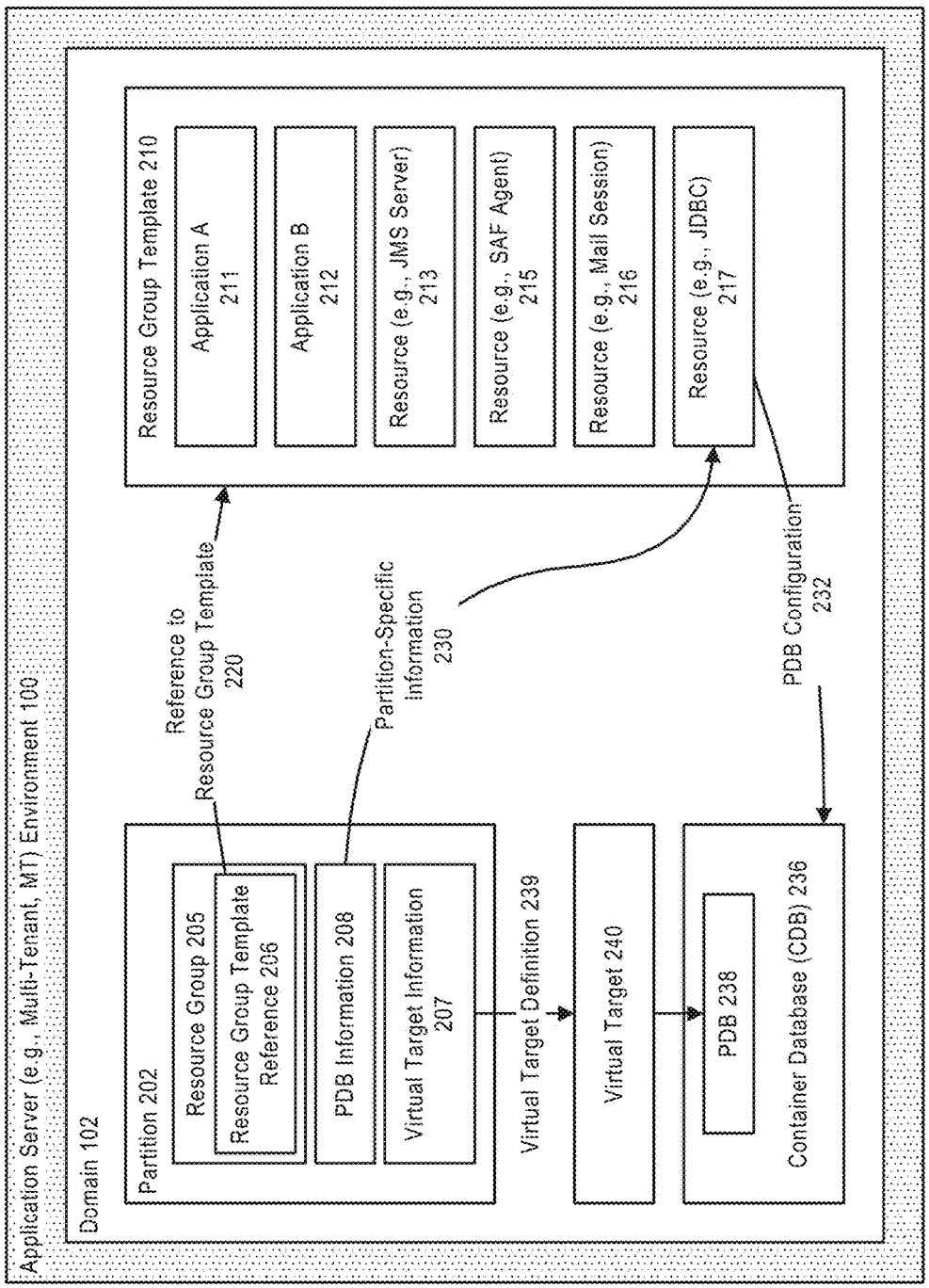
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
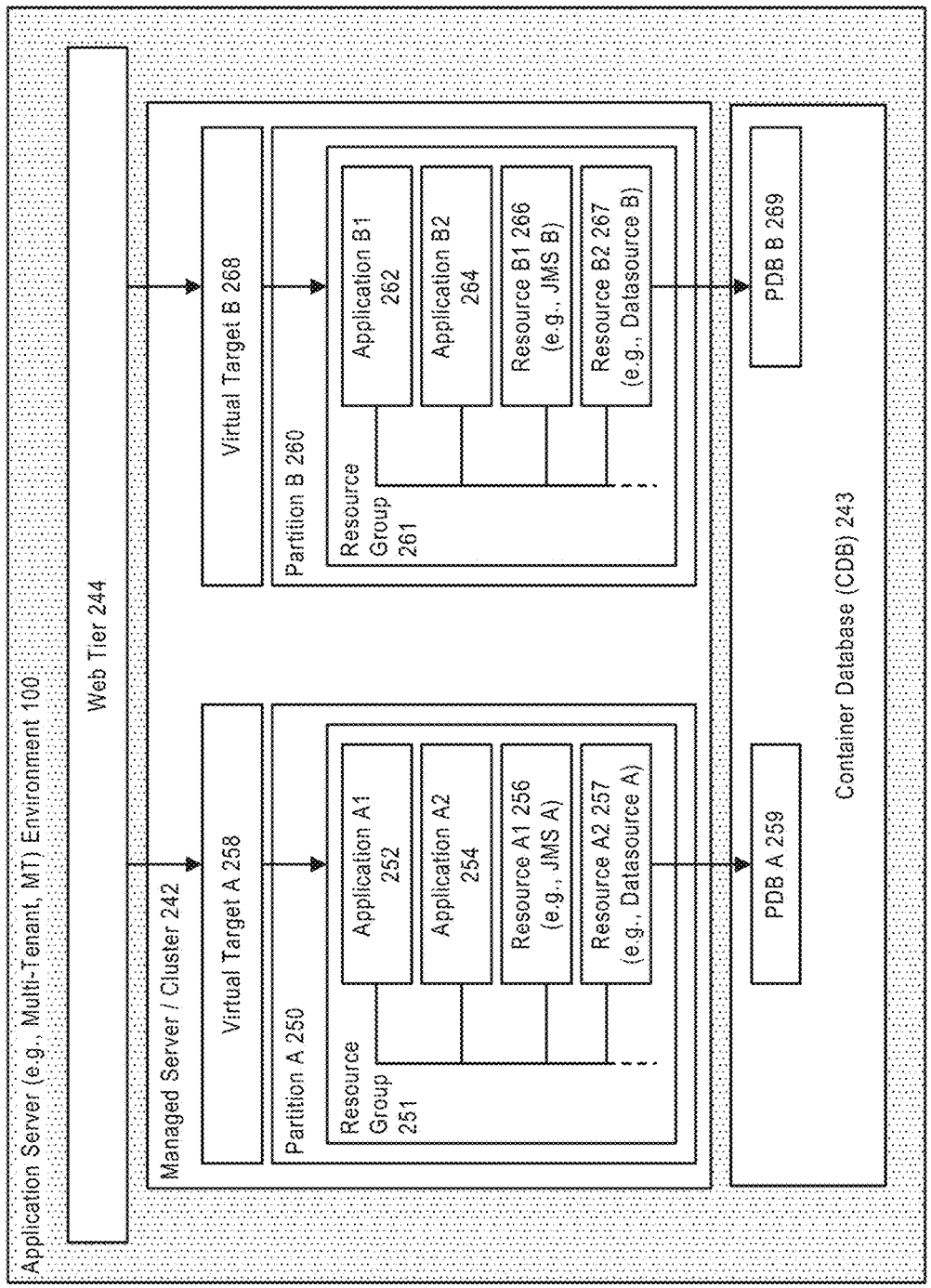
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and resources, and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit. For example, in the medical records (MedRec) application described below, a resource grouping defines the MedRec application and its resources. Resource groups can be configured at the domain level or at the partition level. If configured at the partition level, a resource group is specific to the partition. However, multiple partitions can each run a resource group that references the same resource group template created and configured within the domain. For example, multiple resource groups can reference a MedRec resource group template, with each resource group using partition-specific configuration information, such that the applications that are part of each MedRec instance are made specific to each partition.

Resource Group Templates

In accordance with an embodiment, a resource group template is defined at a domain level and includes a collection of deployable resources. A resource group template can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
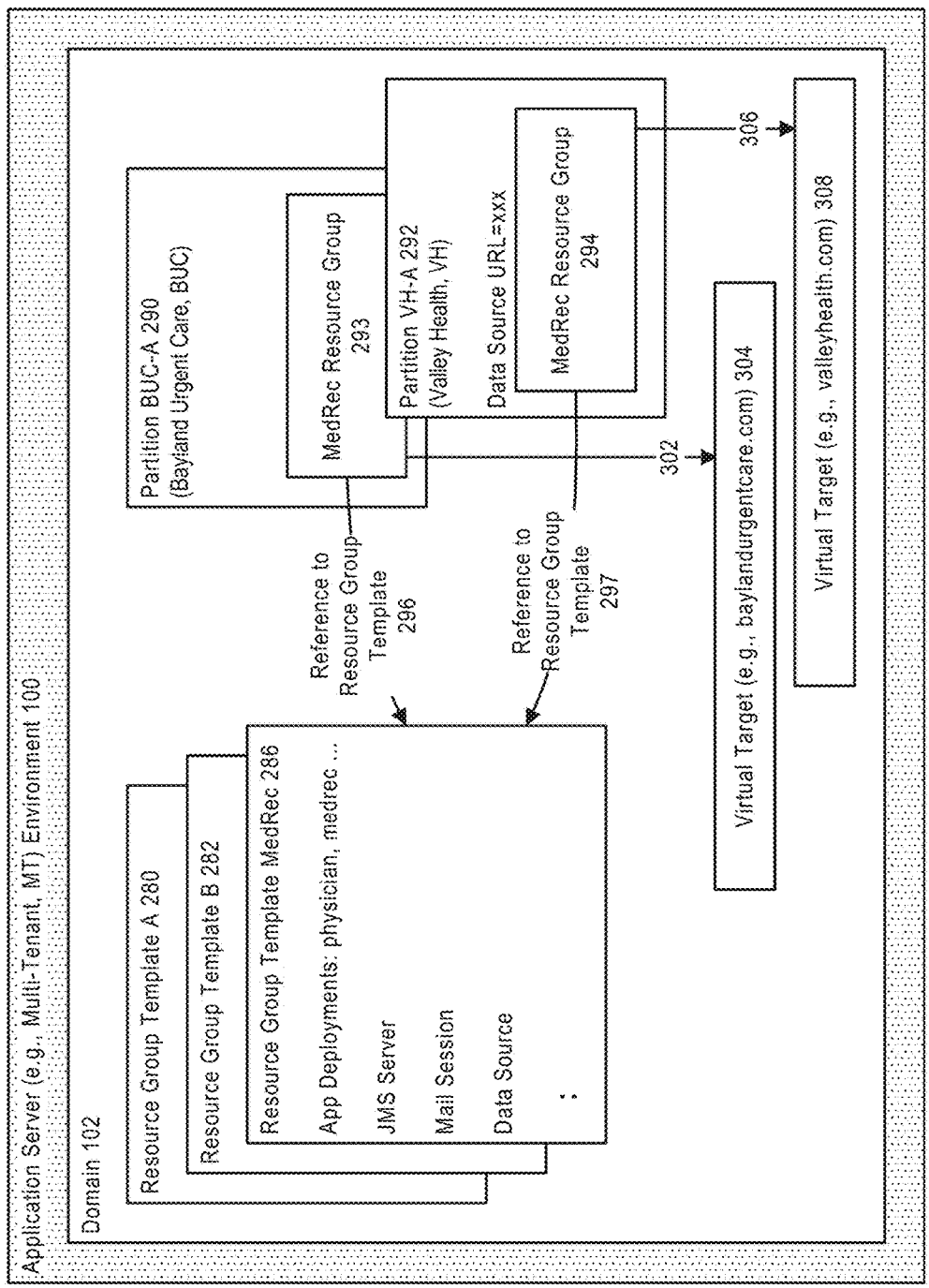
FIG. 4 illustrates an exemplary use of resource group templates, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
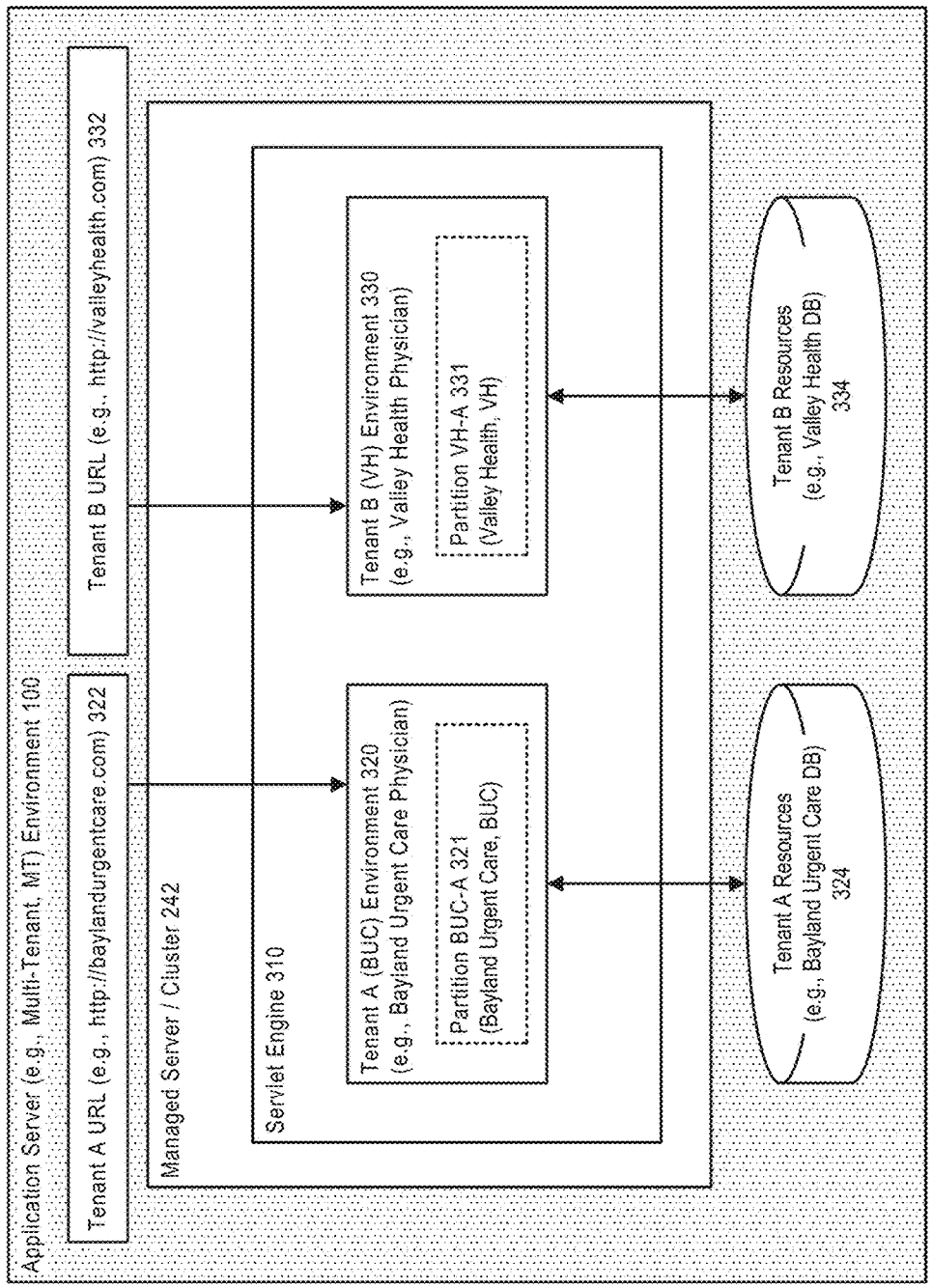
FIG. 5 illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.

Administration Console

In accordance with an embodiment, a system can include support for an administration (admin) console usable in a partitionable environment for operating application software, such as a multi-tenant cloud or application server environment.

In accordance with an embodiment, an admin console can be configured so as to allow an administrator to create and configure domains within an environment, and to create and configure artifacts, including partitions, within one or more of the domains. Each partition provides an administrative and runtime subdivision of a domain.

Figure 6:
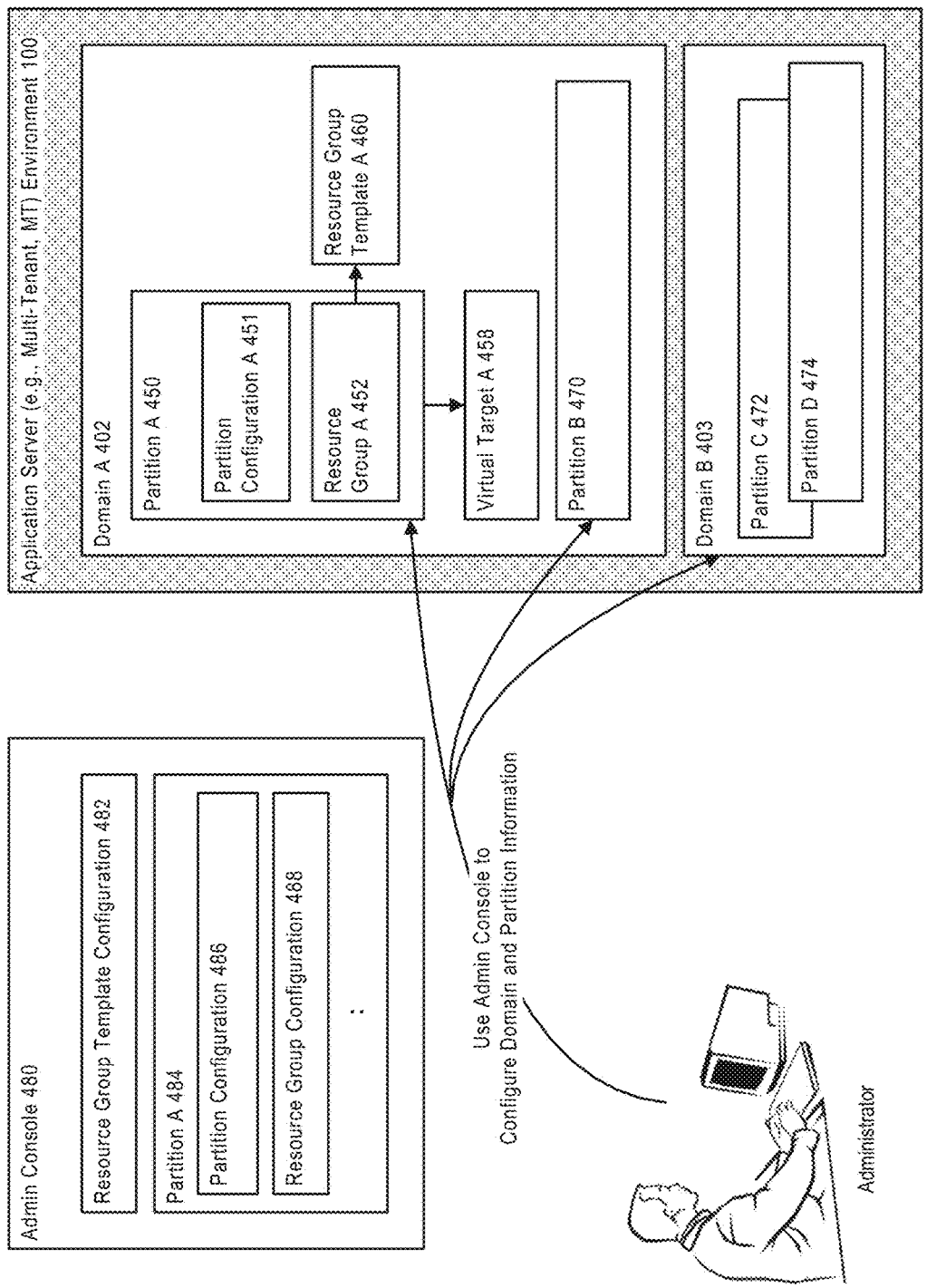
FIG. 6 illustrates a system for providing and administering a partitionable environment for operating software applications, in accordance with an embodiment.

FIG. 6 illustrates a system including an admin console 480 for use in a multi-tenant (MT) application server environment, in accordance with an embodiment. The admin console can be made available to a system administrator permitted systemwide access, and can be made inaccessible to a local administrator permitted limited access. The admin console can be configured as multi-tenant-aware, allowing an administrator of the MT application server environment to assign, to multiple tenants, one or more partitions within one or more domains created, configured and administered via the admin console.

As shown in FIG. 6, the admin console is used to create and configure a pair of domains, domain A 402 and domain B 403, within the MT application server environment. Artifacts can be created and configured 482 within domain A including, for example, resource group template A 460. Partition A 450 and partition B 470 are created 484 and configured 486 within domain A, while partition C 472 and partition D 474 are created within domain B. Partition A has partition configuration A 451. Artifacts can be created and configured 488 within partition A including, for example, resource group A 452 which references resource group template A. Resource group A can be pointed to a virtual target A 458. As discussed above, resource group template A can include a collection of deployable resources. For example, resource group template A can include one or more application deployments together with deployable resources for supporting the one or more application deployments. The configuration of the application server environment illustrated in FIG. 6 is provided merely by way of example. In accordance with other embodiments, environments including different domain, partition, and resource group configurations can be provided.

Figure 7:
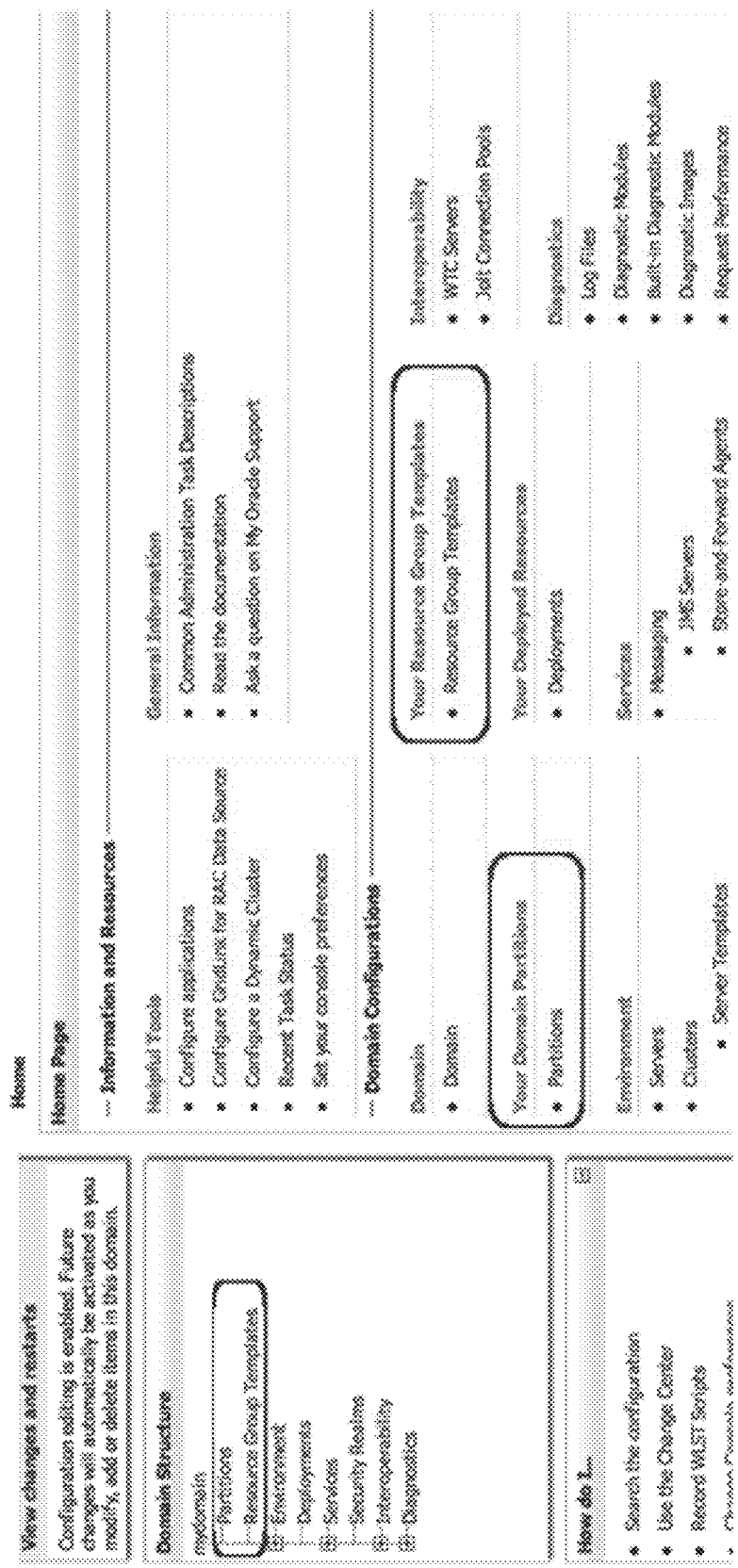
FIG. 7 illustrates a home page for an administration console usable in administering a partitionable environment, in accordance with an embodiment.

FIG. 7 illustrates a home page for an admin console usable for creating and configuring domains, partitions and other artifacts for use in a partitionable environment, in accordance with an embodiment. Domain structure for a selected domain is displayed as a navigation tree. Partitions and resource group templates can be accessed via the navigation tree as top level tree nodes. Other top level tree nodes provide access to other components of the domain including environment (which branch can be expanded to allow access to configurations for servers, machines, etc.), deployments, services and diagnostics.

The home page of the admin console displays the configuration and resource options for the domain in a list format, including a list of partitions and resource group templates that are available to partitions within the domain and which can be referenced by resource groups within the partitions, as well as environment configuration, deployed resources, services, diagnostics, etc.

As organized in FIG. 7, most of the artifacts that an administrator is likely to use are provided in the second column. Artifacts can be accessed by selecting the links provided in the home page and can be created, configured and edited via the pages displayed in the admin console. In some embodiments, some of the artifacts, such as resource groups at the domain level and resource group templates, can also be accessed via the navigation tree.

Figure 8:
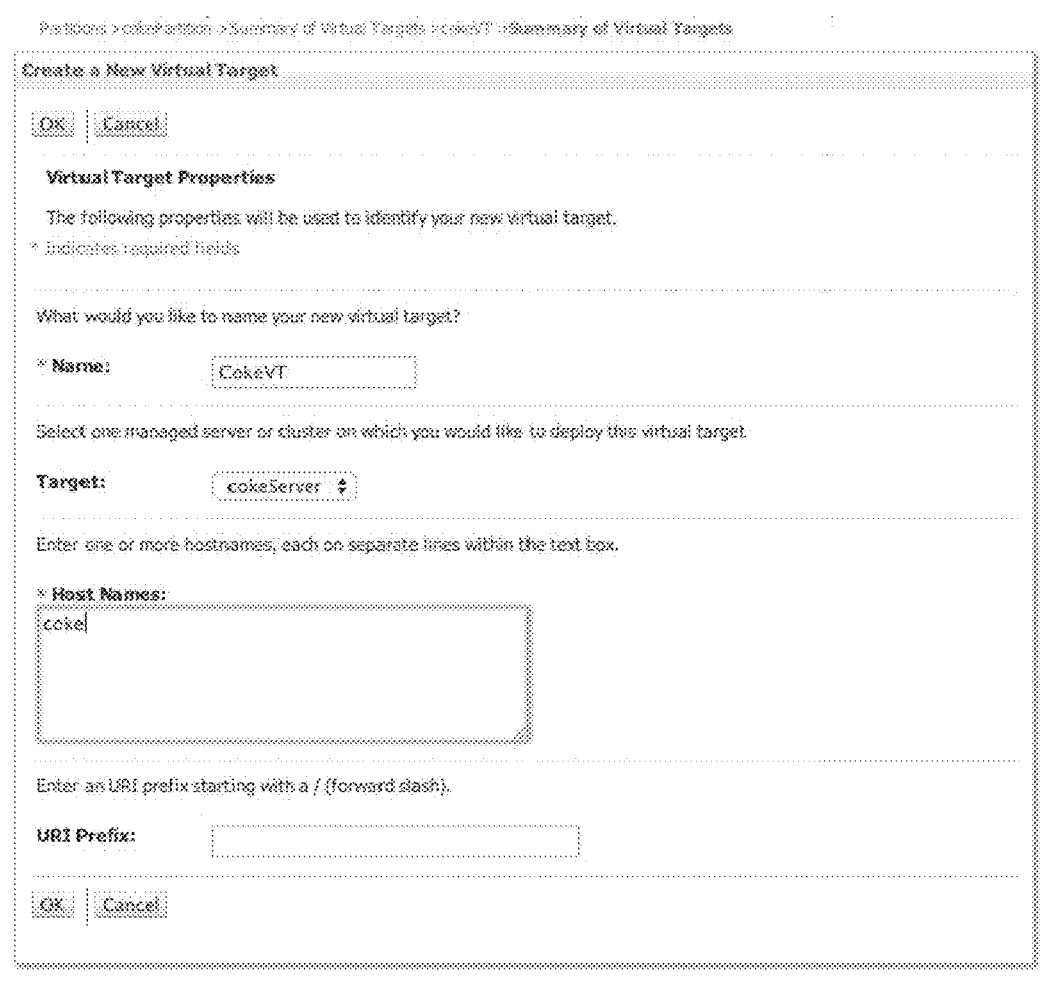
Figures 9, 10:
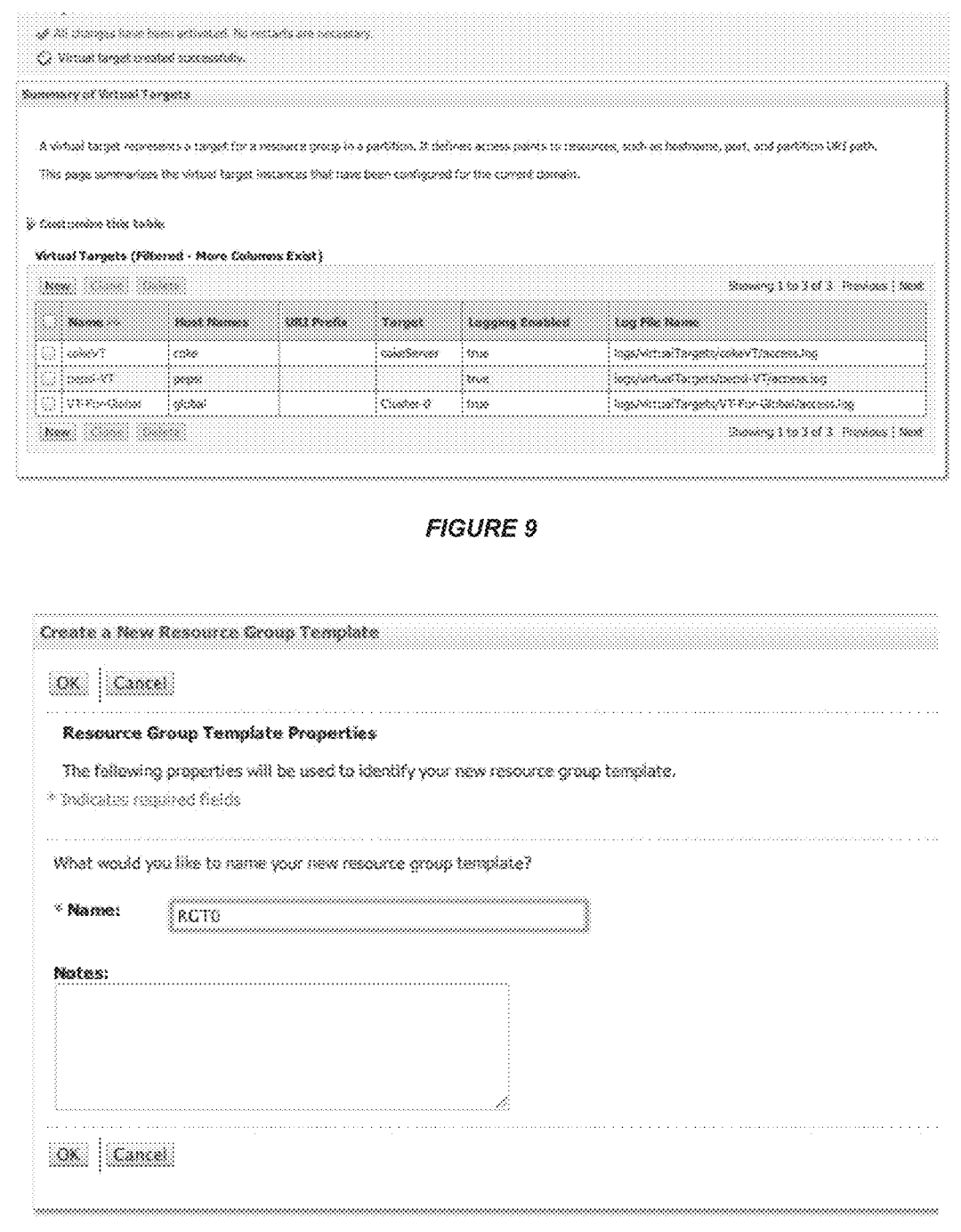

Referring to FIGS. 8 and 9, in accordance with an embodiment, a summary of the virtual targets available to the domain can be accessed via either the navigation tree, e.g. in the environment branch, or via a link provided in the home page. Options are provided for creating, cloning and deleting a virtual target. An administrator can create a virtual target by selecting the "new" button on the summary of virtual targets page. A page is accessed allowing the administrator to create a virtual target. The virtual target can be given a name, e.g. "CokeVT", a managed server or cluster can be selected on which to deploy the virtual target, one or more hostnames can be entered and a URI prefix can be entered. As shown in FIG. 9, once the virtual target is created it will appear in the summary of virtual targets.

Resource group templates at the domain level can similarly be accessed via the navigation tree or via a link provided in the home page. Referring to FIG. 10, in accordance with an embodiment, a resource group template can be created and the administrator will be prompted to enter a resource group template name, e.g. RGT0, and given the option of adding notes.

Figure 11:
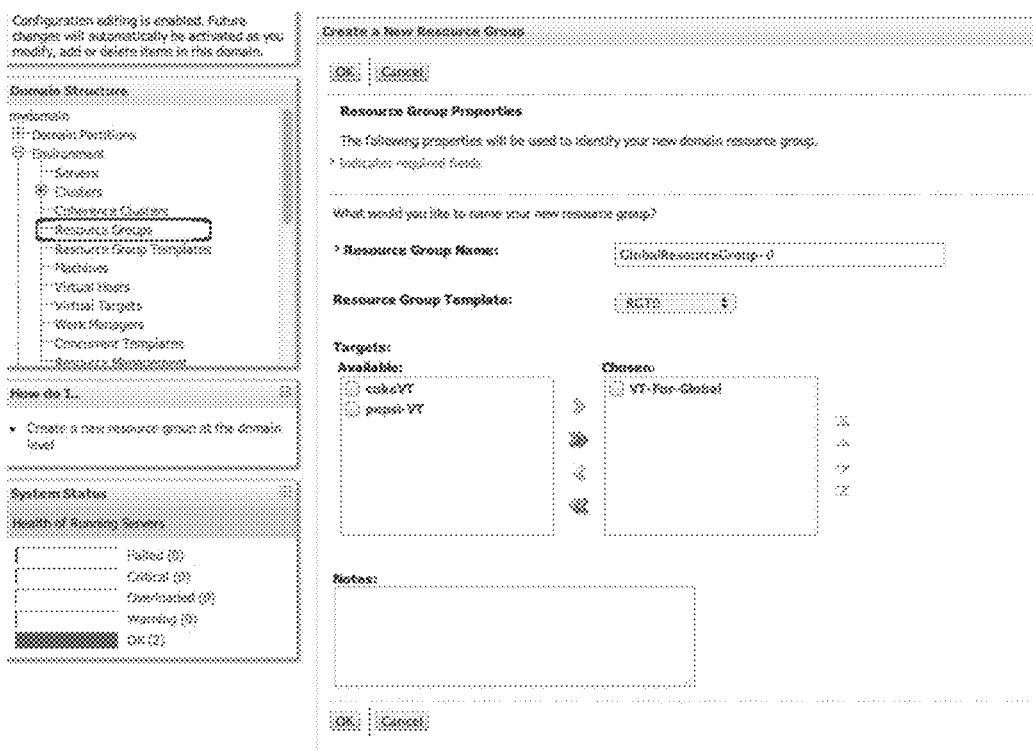

Referring to FIG. 11, in accordance with an embodiment, resource groups can be scoped to a partition or to a domain. Resource group can be accessed at the domain level via the navigation tree or via a link provided in the home page. A resource group can be created and the administrator will be prompted to enter a resource group name, e.g. GlobalResourceGroup-0. The administrator can reference the resource group to a resource group template, e.g. RGT0, choose a virtual target for the reference group and optionally add notes to the reference group.

As described herein, artifacts in a partitionable environment and/or multi-tenant environment, such as a MT application server environment, can include attributes that describe or reference a particular partition or tenant within the environment. A user interface of an admin console can display such attributes as user interface (UI) elements, for example in creation and configuration pages for the artifacts. In accordance with an embodiment, an admin console can detect the presence of a partitionable environment and/or multi-tenant environment. In accordance with an embodiment, UI elements for displaying attributes that describe or reference a particular partition and/or tenant, such as scope, partition name, and other elements, can be displayed in the user interface of the admin console upon detecting the presence of such an environment. If such an environment is not detected by the admin console, the UI elements for the attributes can be omitted from display in the user interface of the admin console.

Artifact Scope and Identity

In accordance with an embodiment, in a partitionable environment, a scope can be ascribed to an artifact based on the application of the artifact across resource group templates, partitions and/or domains, etc. Artifacts having global scope, for example, can be configured at the domain level, either as legacy artifacts or artifacts configured to be visible to all partitions in a domain.

Figure 12:
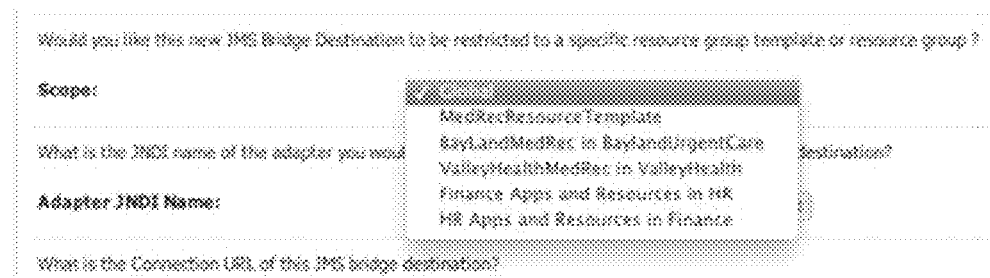
FIG. 12 illustrates scoping for an exemplary artifact, in accordance with an embodiment.

The scope of an artifact can be displayed to an administrator within a creation assistant during creation of the artifact, for example, or as an attribute of an artifact in a column of a table describing the artifact. FIG. 12 illustrates a creation and edit screen for a resource usable with a resource group and/or a resource group template that displays a scope field for the resource and allows selection or change of scope, in accordance with an embodiment. Scope can be selected via a dropdown menu. As shown, the resource JMS Bridge Destination is scoped to "Global", but can optionally be scoped to a number of resource groups and resource group templates displayed in the menu.

In an embodiment, some of the deployable resources can be partition-unaware resources, including some of the deployable resources grouped within a resource group template, while some of the deployable resource can be partition-aware resources.

In an embodiment, resource group templates are uniquely named, having a unique namespace from partitions and partition resource groups. Artifacts configured within a resource group template can identify their scope using a pattern providing context to identify them with a resource group template. For example, such artifacts can identify their scope using a pattern such as "{1} Template", where {1} is the resource group template name.

In an embodiment, resource groups are uniquely named within a partition, but may share a common name across partitions. When a particular partition is selected within a partition listing page, artifacts scoped to the particular partition are displayed. Artifacts configured within a resource group for a partition can identify their scope using a pattern such as "{1} in partition {2}", where {1} identifies the resource group name and {2} identifies the partition name. In a partitionable environment, e.g. a MT application server environment, a data source with a specific configured name can exist in a resource group for a particular partition, but can also exist with the same name in a resource group for a different partition.

In an embodiment, an administrator of a partitionable environment can be provided with a unified view into multiple namespaces using the admin console. Two columns can be included for each configuration, monitoring, and operations table that can display artifacts from more than one namespace. A scope column can provide a human readable string describing the parent scope for the artifact, while a partition column can list all of the partitions in which the artifact is visible.

Together, name and scope uniquely identify an artifact, and partition identifies the visibility of that artifact. Name, scope and partition can be used as filter criteria during table customization, allowing, for example, an administrator to specify that only artifacts visible to a particular partition be displayed regardless of scope.

Partition Creation and Configuration

FIGS. 13-21 illustrate exemplary interface pages and menus for creating and configuring partitions and some of the artifacts associated with partitions, in accordance with an embodiment.

Figures 16, 17:
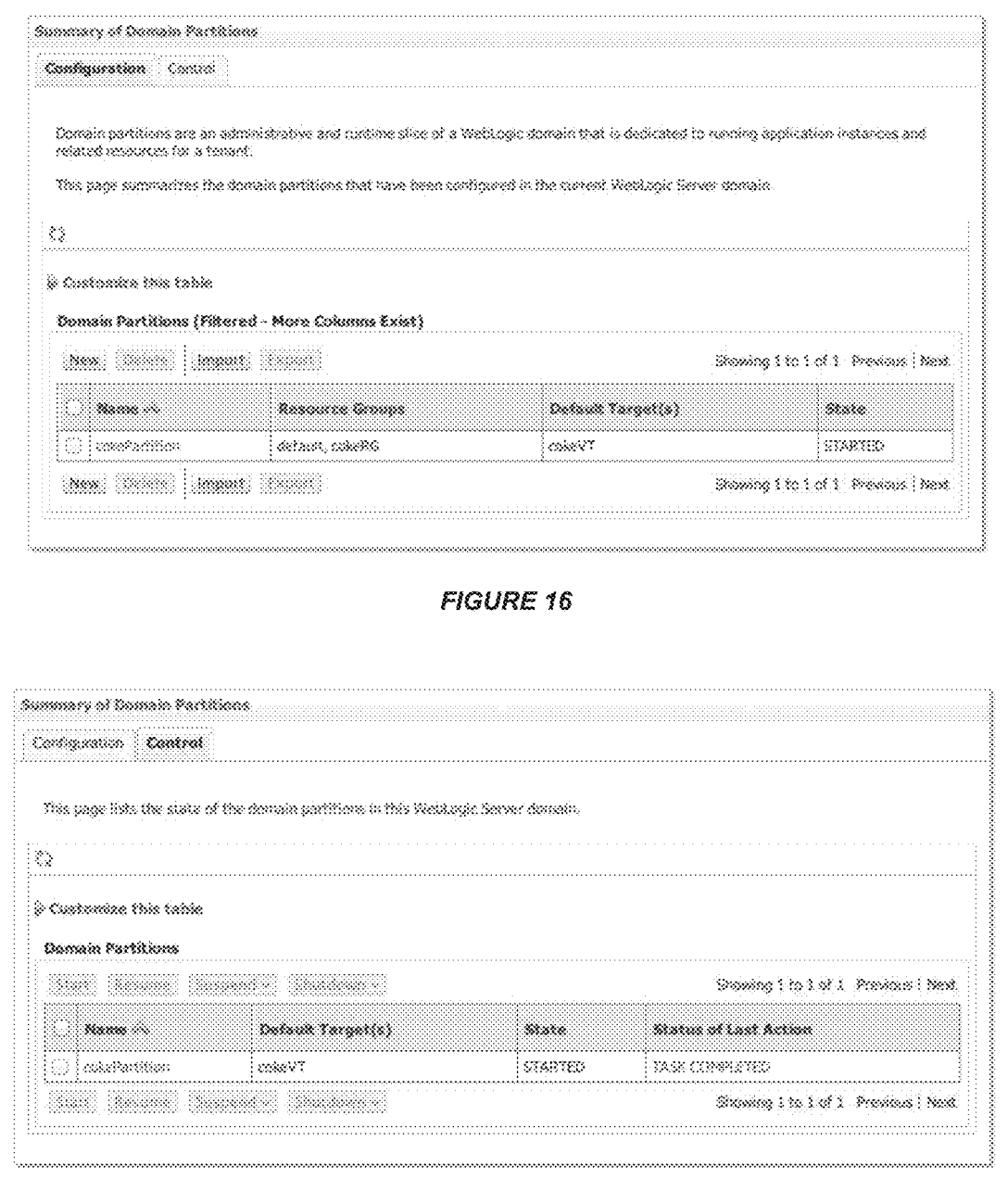

Referring briefly to FIG. 16, in accordance with an embodiment, an administrator can choose to create a new partition, delete an existing partition, import a partition, or export a partition from a listing page displayed in an admin console. The listing page is displayed upon selecting the "partitions" tree node in the navigation tree or upon selecting the link in the home page. A summary of partitions and partition configuration is displayed for the selected domain. As shown, a table is displayed with a row for each partition divided into columns for associated attributes, including an associated virtual target and resource groups. The administrator can customize the column display by selecting "customize this table". An administrator can select the name of a partition displayed within the table to further configure or edit the partition.

Figure 13:
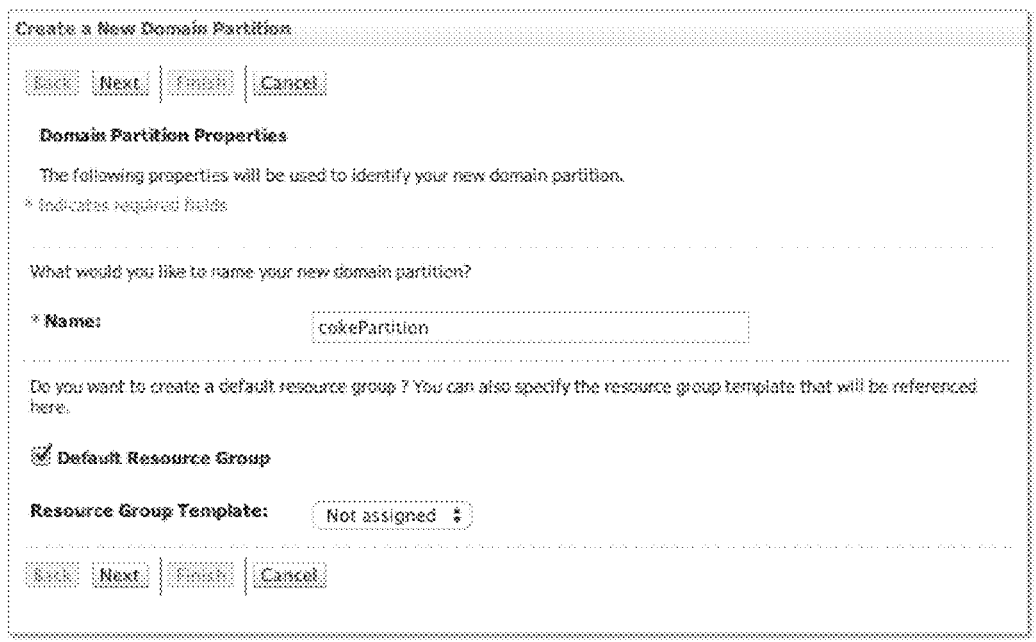
FIGS. 13-15 illustrate creation pages for a domain partition, in accordance with an embodiment.
Figure 14:
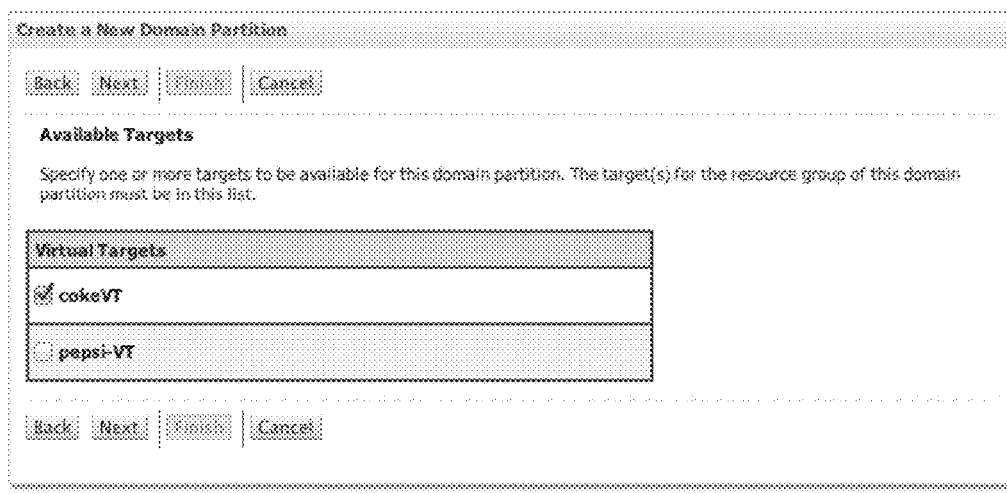
Figure 15:
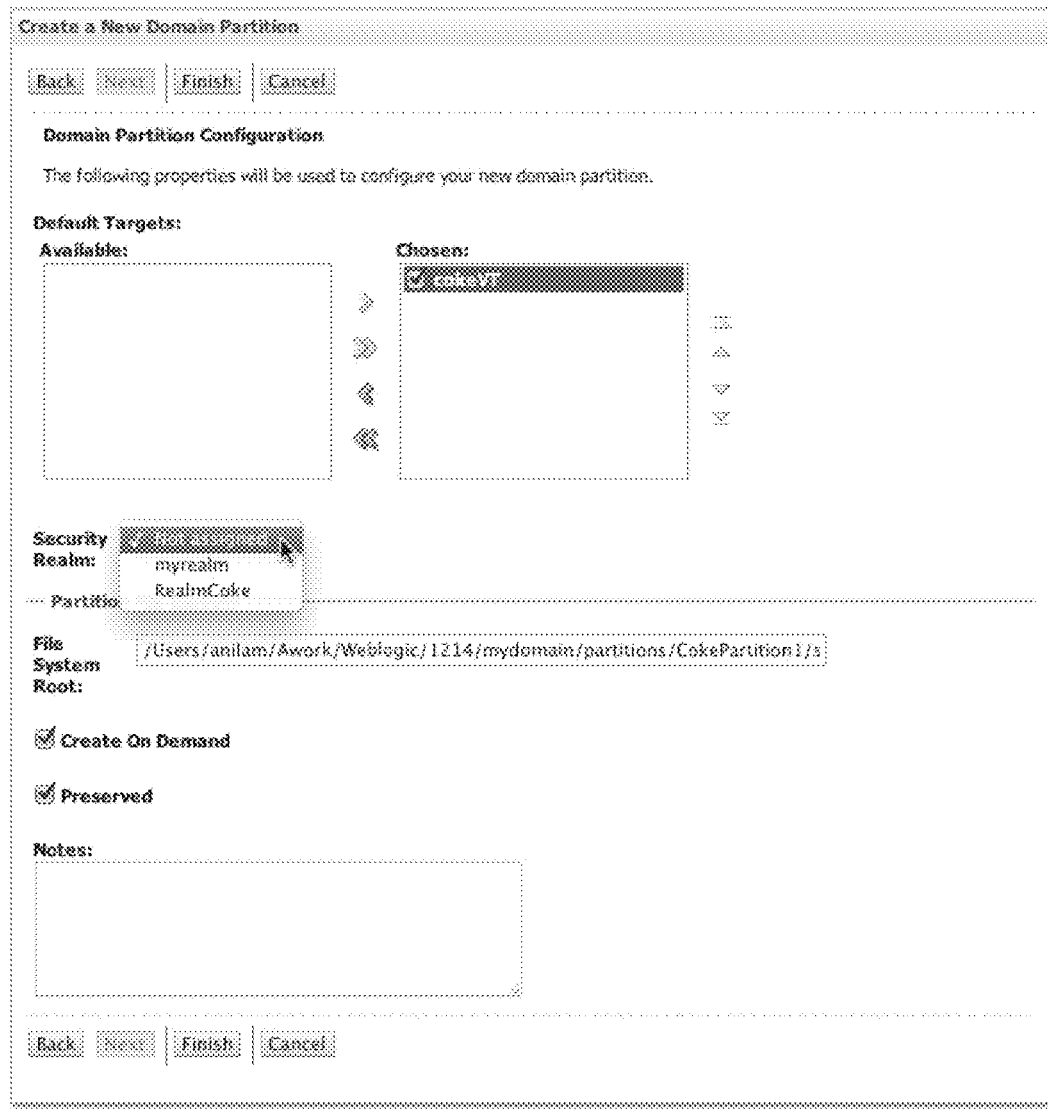

In accordance with an embodiment, an administrator can create a new partition by selecting the "new" button on the listing page. Referring to FIGS. 13-15, upon initiating the creation of a new partition, a creation assistant can step the administrator through a selection of properties for the partition, for example via one or more pages and/or menus.

Referring to FIG. 13, in accordance with an embodiment, the administrator can be prompted to name the new partition. Optionally, a default resource group can be created for the partition to enable deployment of an application. A resource group template can be specified for the default resource group to reference.

Referring to FIG. 14, in accordance with an embodiment, the administrator can next be presented with a list of virtual targets, from which one or more virtual targets can be specified as available to the partition. A default virtual target can be specified for use as the virtual target for resource groups under the partition that do not specify a target.

Referring to FIG. 15, in accordance with an embodiment, the administrator can next be prompted to select a security realm for the new partition and designate a file system root.

In an embodiment, when creating the partition the admin console can access application server configuration information, for example using a Java Management Extension (JMX) object such as a domain mbean, to create the partition and save the configuration information for the partition.

In an embodiment, rather than creating a new partition, an administrator can choose to clone an existing partition by selecting a "clone" button (not shown). A partition created by cloning can be assigned to the same or a different tenant, for example. Optionally, the configuration and deployable resources of the clone can be edited by the administrator.

Referring again to FIG. 16, in accordance with an embodiment, after a new partition is created, the new partition is displayed in the summary of partitions and partition configuration. The administrator can select the name of the partition, now displayed within the table, to further configure or reconfigure the partition.

Referring to FIG. 17, in accordance with an embodiment, the administrator can select a control sub tab at the summary page to start, resume, suspend, or shutdown a partition, and to observer a state of the partition and a status of a last action for the partition.

Figure 18:
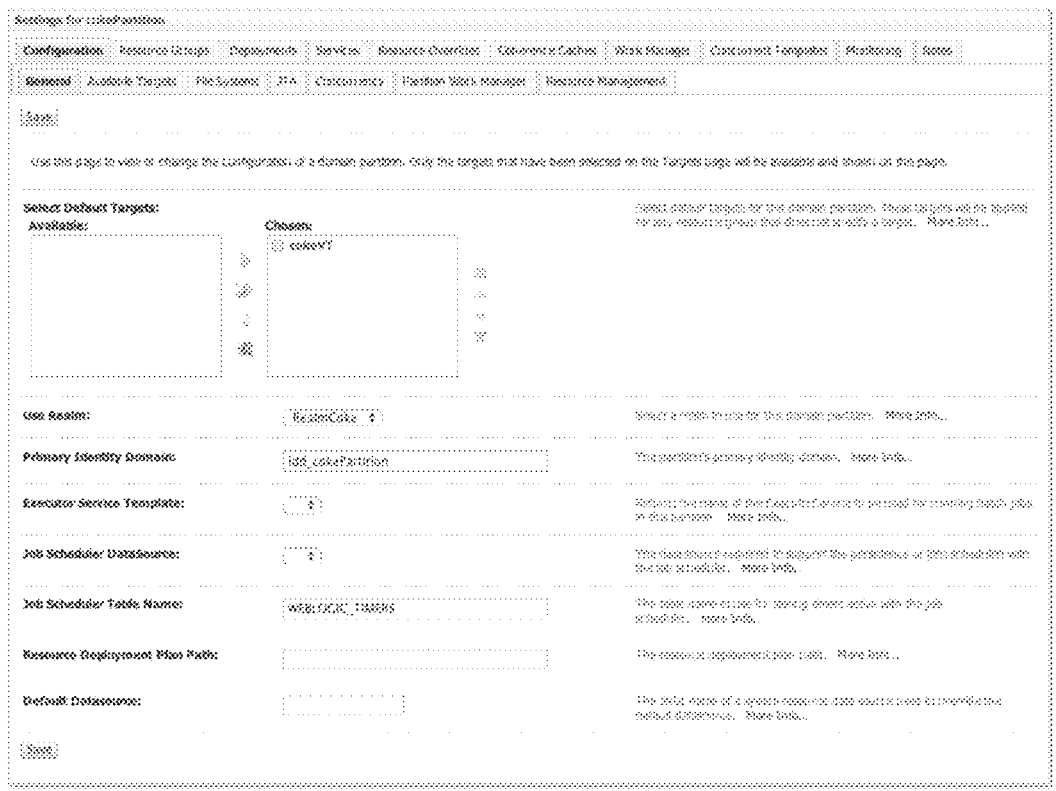

Referring to FIG. 18, in accordance with an embodiment, each partition can include sub tabs for accessing and viewing partition information. For example, partitions can include sub tabs for configuration, available targets, resource groups, deployments, services, coherence cache, concurrency utilities, work managers, batch and notes. Of the sub tabs, the deployments sub tab lists applications and libraries that are deployed to the partition and the services sub tab lists services and associated resources deployed to the partition. A scope column for each list indicates the resource group or resource group template with which a deployed object or a service is associated. An administrator can modify the scope of a deployed object or a service, but only at a domain level deployments or service page, and not via the sub tab.

Figure 19:
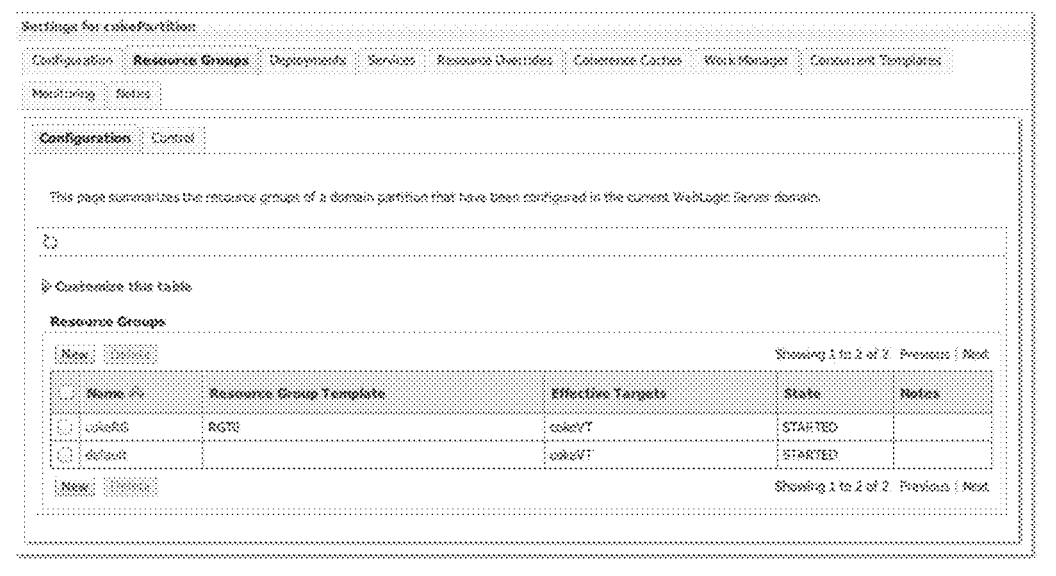

Referring to FIG. 19, in accordance with an embodiment, resource groups within the partition can be accessed via the resource group sub tab. A resource group created by default within a new partition can be edited and configured by an administrator. For example, a resource group created by default can be edited so as to reference a resource group template. Further, the administrator can create, configure and edit additional resource groups within the new partition. For example, the administrator can edit an existing resource group so as to change the reference group template that the resource group references. An administrator can refer to resource group templates through the resource group sub tab to view lists of resources that are part of the resource group templates.

Figure 20:
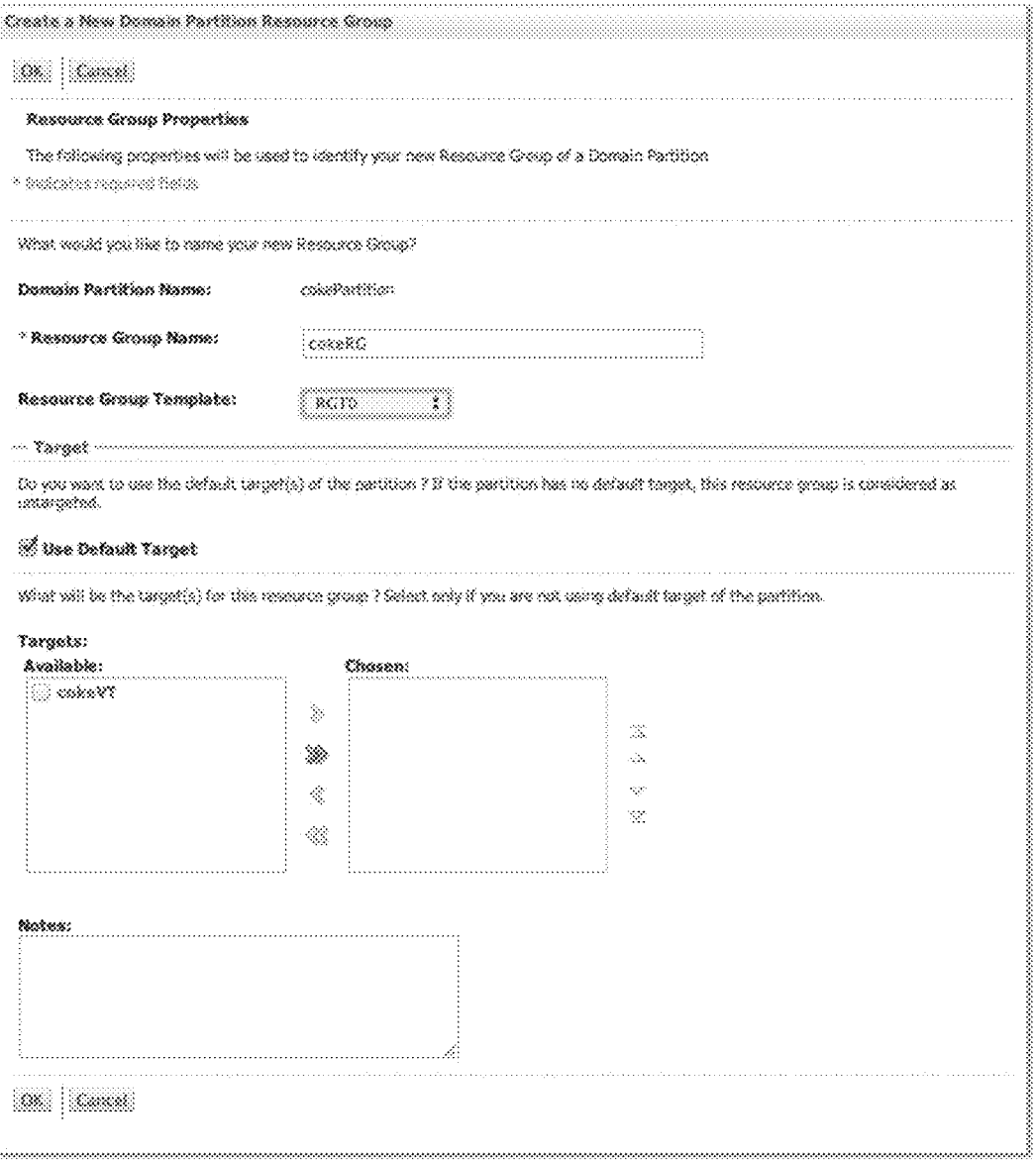
FIG. 20 illustrates a creation page for a resource group scoped to a partition, in accordance with an embodiment.
Figure 21:
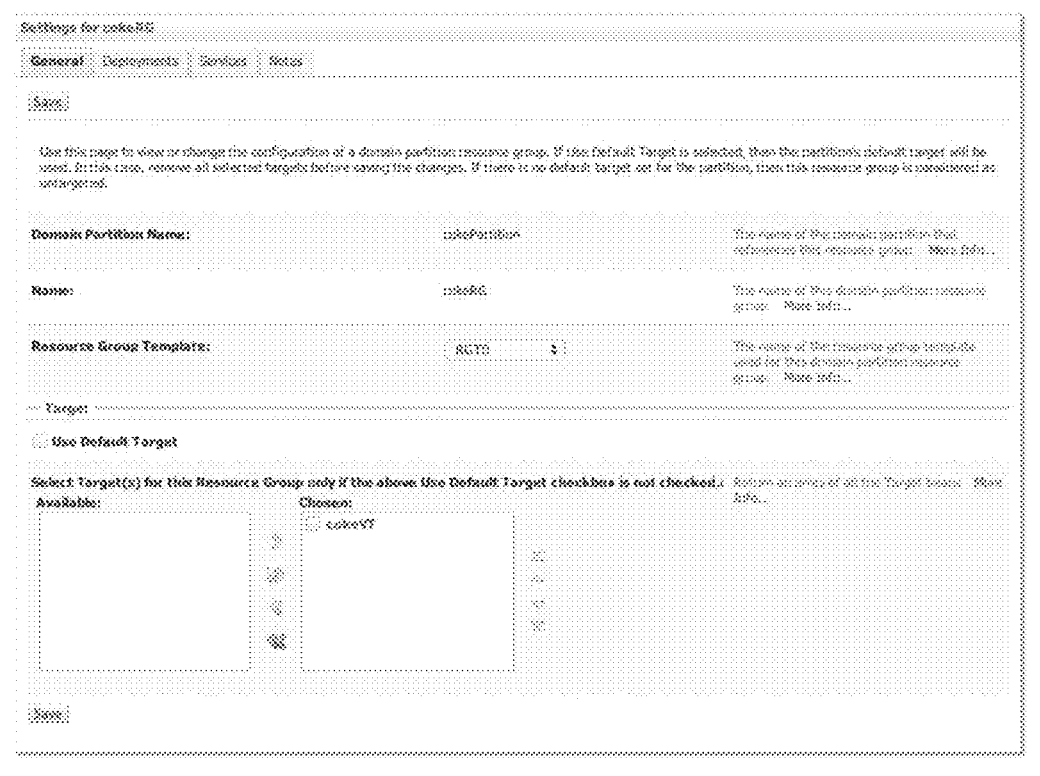

Once a partition is created, the administrator can create one or more additional resource groups scoped to that partition by selecting the "new" button on the resource group page. Referring to FIG. 20, in accordance with an embodiment, the resource group can be named, a resource group template can be selected for the resource group to reference, and either the default virtual target can be designated, or a virtual target can be selected from a list of available virtual targets. Referring to FIG. 21, in accordance with an embodiment, once a resource group is created it can be accessed through the resource groups sub tabs for further configuring or reconfiguring.

In an embodiment, a column for notes can be provided on the listing page for annotating each partition, and a notes sub tab can be provided for each partition. Notes can be descriptive of the partition and other configuration elements in a domain configuration. During creation of a partition, a text box for adding notes to describe the partition can be provided to the administrator via the admin console. Notes can be applied not only to a description of the partition, but also to artifacts scoped to a resource group or resource group template, for example. During configuration of an artifact in a partitionable environment, a configuration assistant can prompt an administrator to add comments that are modifiable using the notes sub tab or table column.

Figure 22:
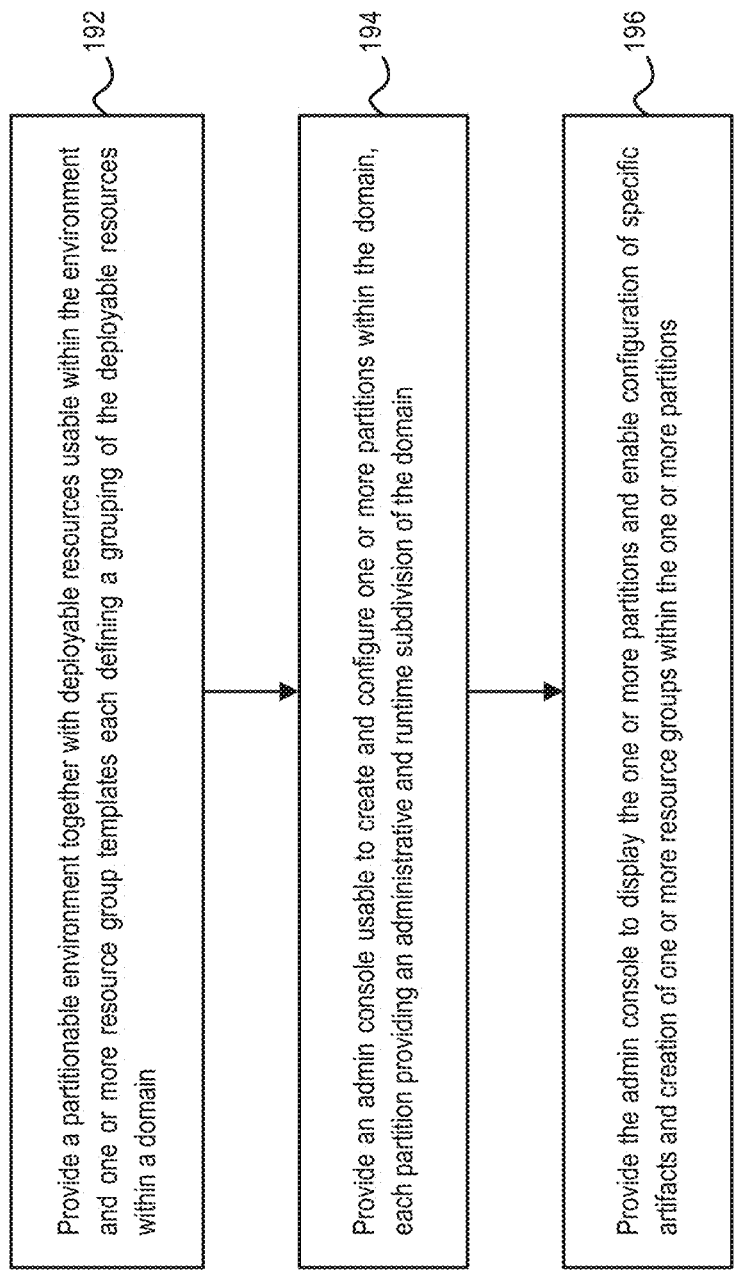
FIG. 22 is a flowchart that illustrates a method for providing and administering a partitionable environment for operating application software, in accordance with an embodiment.

FIG. 22 is a flowchart that illustrates a method for providing and administering an exemplary multi-tenant environment, in accordance with an embodiment. As shown in FIG. 22, in accordance with an embodiment, at step 492, a partitionable environment is provided, together with deployable resources usable within the environment and one or more resource group templates. Each of the one or more resource group templates defines a grouping of the deployable resources within a domain.

At step 494, an admin console is provided, which is usable to create and configure one or more partitions within the domain. Each partition provides an administrative and runtime subdivision of the domain.

At step 496, the admin console displays the one or more partitions and enables configuration of specific artifacts and creation of one or more resource groups within the one or more partitions. At least one of the one or more resource groups references a resource group template from the one or more resource group templates.

Partition Import and Export

In an embodiment, the admin console is usable by an administrator to export a partition from a domain. A partition archive is produced when a partition is exported from a domain, for example by selecting the "export" button on the summary of partitions page. The partition archive includes the partition configuration, resources groups contained in the partition and the resource group templates referenced by the resource groups, and the contents of the partition's filesystem. Optionally, the partition archive can include the binaries and configurations for applications deployed to the partition. The administrator can specify the name and location of the partition archive on the server and select whether to include the deployed application binaries and configurations.

In an embodiment, the admin console is usable by an administrator to download a partition archive to a client machine.

In an embodiment, the admin console is usable by an administrator to import a partition to another domain from a partition archive, for example by selecting the "import" button on the summary of partitions page. Upon importing the partition, the administrator can update the dependencies on the domain, such as virtual targets and security realm, as well as any other attributes in the partition configuration needed to make the partition configuration valid. For example, partition properties and other resources in the resource group may require updating.

An administrator may choose to change an attributes.json file containing the mbean attributes/properties while importing a partition. In an embodiment, the admin console can present to the administrator an attribute list and a default value, and a modified list, allowing the administrator to select the default value or specify another value.

Application Deployment to a Partitionable Environment

In an embodiment, an application deployment wizard is usable by an administrator to specify the scope of an application deployment via one or more pages and/or a dropdown menu. The administrator can select global, the resource group of a partition or a resource group template. If the administrator selects global, the administrator is prompted to choose all of the targets to which the application or library is to be deployed. If a resource group or resource group template is selected, the target selection step is skipped.

Upon stepping through the required deployment configuration steps, the application deployment wizard can display a summary table either showing the targets, or the resource group and resource group templates that the user selects in previous steps, allowing the administrator to review deployment choices and finish the deployment.

Figure 23:
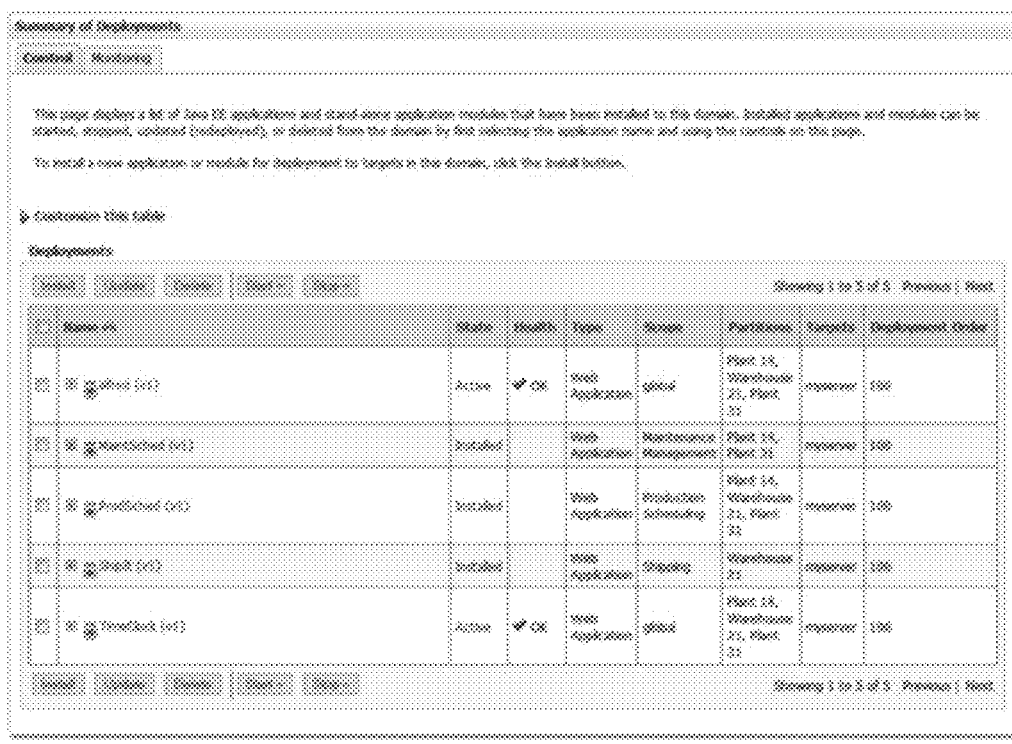
FIG. 23 illustrates a summary of deployments page displayable in an administration console, in accordance with an embodiment.

FIG. 23 illustrates a summary of deployments page accessible via the admin console, in accordance with an embodiment. Deployments and supporting resources configured at a global scope, a global resource group, a resource group in a partition, or a resource group template scope can be displayed in a top level page providing a comprehensive, at a glance view of the configuration at all levels within a domain. The top level page includes a column for scope that provides a human readable string describing the parent scope for the artifact and a column for partition that lists all of the partition in which the artifact is visible. Table pages are accessible via the admin console for each of the scopes that display artifacts configured at those scopes.

Resource Overriding and Partition Administration

Figure 24:
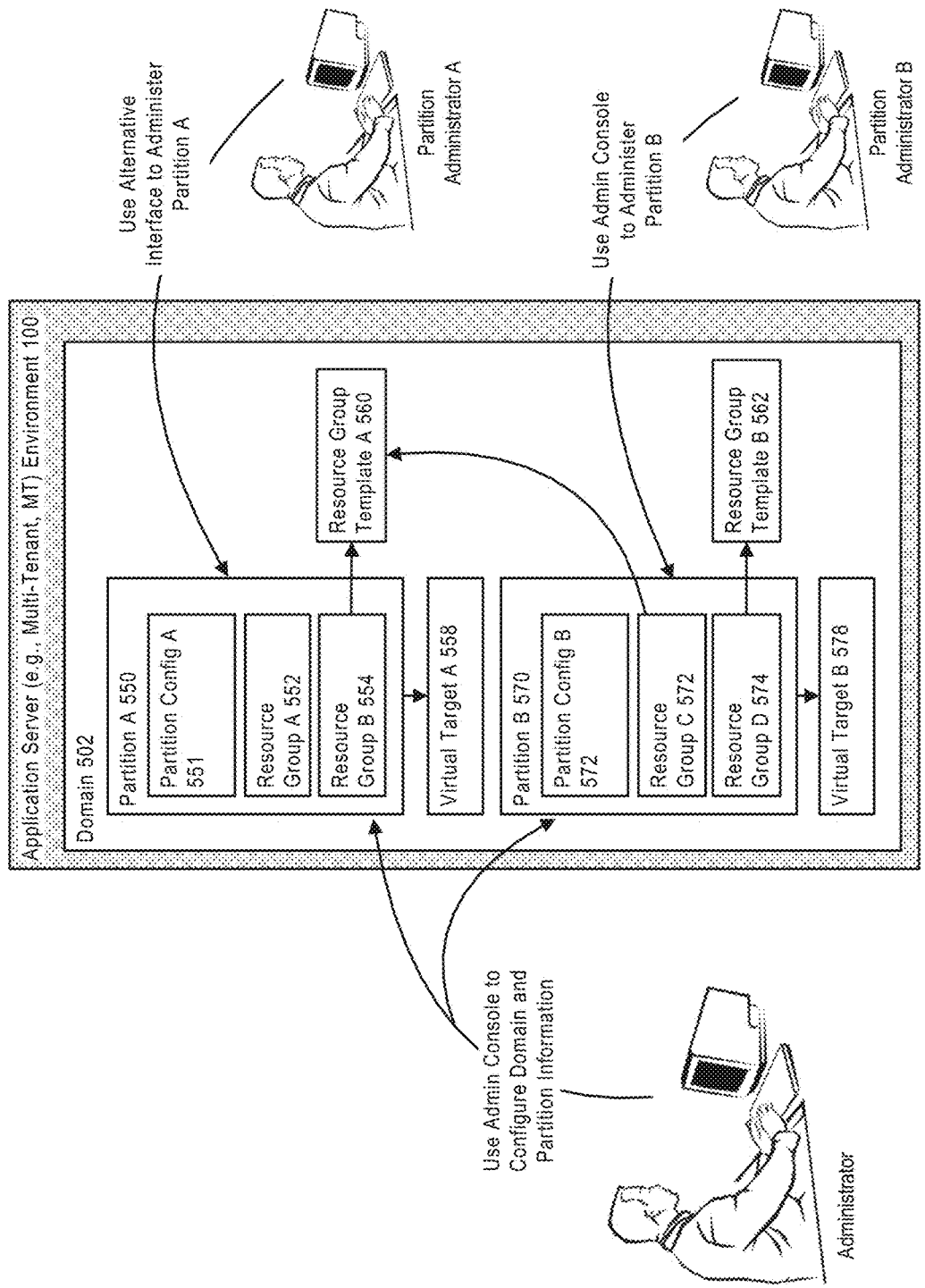
FIG. 24 illustrates a system for providing and administering an exemplary multi-tenant environment, in accordance with an embodiment.

FIG. 24 illustrates a system including an admin console for use in a multi-tenant (MT) application server environment, in accordance with another embodiment. As shown, the admin console is used to create and configure a domain 502 within the MT application server environment. Partition A 550 and partition B 570 are created and configured within the domain. Partition A includes partition configuration 551 information, and can include resource group A 552 that does not reference a resource group template and resource group B 554 which references resource group template A 560. Resource group A and resource group B access partition A via virtual target A 558. Partition B includes partition configuration 571 information, and can include resource group C 572 which references resource group template A and resource group D 574 which reference resource group template B 562. Resource group C and resource group D access partition B via virtual target B 578. As above, the configuration of the MT application server environment illustrated in FIG. 24 is provided merely by way of example, and in accordance with other embodiments, different domain, partition, resource group configurations can be provided.

Resource group B and resource group C both reference resource group template A. Partition A and partition B may be accessed using the admin console to override certain configuration information of resource group template A as applied within the respective partitions. For example, an administrator may desire to override a configuration of a supporting resource, such as a username that is permitted to log into a datasource, so that the configuration information is particular to a partition. The configuration information which the admin console is usable to override can be determined on a component by component basis by the owner of said component. For example, a JMS messaging service may deny an administrator the ability to override configuration information for JMS messaging service.

There are a number of overriding config beans for each partition. In an embodiment, the admin console can include, for a displayed partition, a tab labeled "override". The override tab can provide access to sub tabs for each of the resources that can be overridden. Each sub tab provides listing/create/delete/edit options for the config bean associated with the resource. In an embodiment, the admin console further provides, within a resource group deployments tab of a partition, a table listing all of the deployments for a particular resource group. The administrator can select applications that needs customization and select an "override" button. The administrator can then specify a different deployment plan path so as to override the default one in the resource group template.

In accordance with an embodiment, the admin console is usable by users having different roles with different access privileges. A system administrator can use the admin console to create, configure and administer partitions and artifacts within a partitionable environment, while a partition administrator can be limited to using the admin console to administrate a partition within a partitionable environment created by a system administrator, and a tenant administrator can be limited to using the admin console to administer one or more partitions assigned to a tenant.

In accordance with an embodiment, administration of a partition, or of multiple partitions assigned to a tenant can be enabled for certain components of the partition or multiple partitions using tools other than the admin console. For example, as shown in FIG. 24, partition administrator A can manage and monitor applications on partition A using an alternative interface, e.g. Enterprise Manager (EM) from Oracle, while partition administrator B can manage and monitor applications on partition B using the admin console, e.g. WLS console. The admin console and the alternative interface can use the same or different tools for administering the partitions. For example, the admin console can use RESTful management, while the alternative interface can use JMX tools.

In accordance with an alternative embodiment, the admin console is usable by an administrator whose role is creating, configuring and administering a partitionable environment, and is not accessible to a partition administrator whose role is administering a partition within the partitionable environment or a tenant administrator whose role is administering one or more partitions assigned to a tenant. In such an embodiment, administration of a partition, or of multiple partitions assigned to a tenant can be enabled using tools other than the admin console, e.g. EM, for managing and monitoring for certain components of the partition or multiple partitions.

Monitoring and Statistics and Aggregation of Artifact Metrics

In accordance with an embodiment, an admin console can provide monitoring and statistics of the resources and deployed applications. This information can be displayed as a sub tab of the resource, and is gathered through the resources or applications runtime mbeans accessed through the domain runtime mbean. In an MT environment, the resources and applications runtime mbean are also available through the partition runtime mbeans. In accordance with an embodiment, the admin console obtains the statistics for the partition by discovering the runtime mbeans of the partitions and displays them to an administrator.

In accordance with an embodiment, an admin console can provide, for some artifact types, monitoring table pages that aggregate metrics and status for an artifact across server boundaries. For example, the admin console can provide a table displaying total session metrics for an application across a domain. Metrics can be collected from each server that an application is operating on. Collected values can be summed, averaged, minimized or otherwise aggregated, and a domain-wide summary can be displayed on the admin console. In an embodiment, the admin console does not aggregate values across scopes and each artifact in each scope is viewed as a unique instance regardless of any similarities of names or configuration values.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for providing and administering a partitionable environment for operating application software, comprising:
one or more computers, each of the one or more computers including a processor and memory,
the partitionable environment executing on the one or more computers,
wherein the partitionable environment includes a domain configuration that is used at runtime to define a domain for deployment and execution of the software applications, together with
a plurality of deployable resources usable within the partitionable environment, and one or more resource groups, wherein each resource group defines a grouping of the plurality of deployable resources; and an administration console usable to create and configure one or more partitions within the domain, wherein each partition of the one or more partitions is associated with a partition identifier and a partition configuration, and provides an administrative and runtime subdivision of the domain for a tenant, wherein the administration console displays the one or more partitions and is usable to create and configure artifacts via the one or more resource groups within the one or more partitions, each artifact being assigned to a namespace based on a resource group and a partition within which it is created, wherein the administration console displays, via a graphical user interface, namespaces within the domain and, for each artifact assigned to a namespace, displays a scope of that artifact and the partition identifier for a partition within which that artifact is created, and wherein an artifact is usable by an application deployed to the same partition and having the same scope as the artifact.

2. The system of claim 1, wherein the partitionable environment is one of an application server environment and a cloud environment.

3. The system of claim 1, wherein the administration console is usable to create and configure one or more resource groups within the one or more partitions.

4. The system of claim 1, wherein the partitionable environment includes two or more domains, wherein each resource group defines a grouping of the plurality of deployable resources within the two or more domains, and wherein the administration console is usable to create and configure one or more partitions within each of the two or more domains.

5. The system of claim 1, wherein the plurality of deployable resources comprises one or more partition-aware resources, and one or more partition-unaware resources.

6. The system of claim 1, wherein each of the one or more resource groups is a package of one or more deployments and supporting resource configurations.

7. The system of claim 6, wherein the administration console is usable to override one or more supporting resource configurations of a resource group.

8. The system of claim 1, wherein the one or more partitions are each configurable to be partially administered internally to the one or more partitions.

9. A method for providing and administering a partitionable environment for operating application software, comprising:

providing the partitionable environment executing on one or more computers, each of the one or more computers including a processor and memory, wherein the partitionable environment includes a domain configuration that is used at runtime to define a domain for deployment and execution of the software applications, together with a plurality of deployable resources usable within the partitionable environment, and one or more resource groups, wherein each resource group defines a grouping of the plurality of deployable resources; and providing an administration console usable to create and configure one or more partitions within the domain, wherein each partition of the one or more partitions is associated with a partition identifier and a partition configuration, and provides an administrative and runtime subdivision of the domain for a tenant, wherein the administration console displays the one or more partitions and is usable to create and configure artifacts via the one or more resource groups within the one or more partitions, each artifact being assigned to a namespace based on a resource group and a partition within which it is created, wherein the administration console displays, via a graphical user interface, namespaces within the domain and, for each artifact assigned to a namespace, displays a scope of that artifact and the partition identifier for a partition within which that artifact is created, and wherein an artifact is usable by an application deployed to the same partition and having the same scope as the artifact.

10. The method of claim 9, wherein the environment is one of an application server environment and a cloud environment.

11. The method of claim 9, wherein the administration console is usable to create and configure one or more resource groups within the one or more partitions.

12. The method of claim 9, wherein the environment includes two or more domains; and wherein each resource group defines a grouping of the plurality of deployable resources within the two or more domains, and wherein the administration console is usable to create and configure one or more partitions within each of the two or more domains.

13. The method of claim 9, wherein each of the one or more resource groups is a package of one or more deployments and supporting resource configurations.

14. The method of claim 13, wherein the administration console is usable to override one or more supporting resource configurations of a resource group.

15. The method of claim 9, wherein the one or more partitions are each configurable to be partially administered internally to the one or more partitions.

16. A non-transitory computer readable storage medium, including instructions stored thereon which when read and executed by one or more computers cause the one or more computers to perform the steps comprising:

providing a partitionable environment executing on one or more computers, each of the one or more computers including a processor and memory, wherein the partitionable environment includes a domain configuration that is used at runtime to define a domain for deployment and execution of the software applications, together with a plurality of deployable resources usable within the environment, and one or more resource groups, wherein each resource group defines a grouping of the plurality of deployable resources; and providing an administration console usable to create and configure one or more partitions within the domain, wherein each partition of the one or more partitions is associated with a partition identifier and a partition configuration, and provides an administrative and runtime subdivision of the domain for a tenant, wherein the administration console displays the one or more partitions and is usable to create and configure artifacts via the one or more resource groups within the one or more partitions, each artifact being assigned to a namespace based on a resource group and a partition within which it is created, wherein the administration console displays, via a graphical user interface, namespaces within the domain and, for each artifact assigned to a namespace, displays a scope of that artifact and the partition identifier for a partition within which that artifact is created, and wherein an artifact is usable by an application deployed to the same partition and having the same scope as the artifact.

* * * * *